United States Patent
Blech et al.

(10) Patent No.: US 6,587,253 B2
(45) Date of Patent: Jul. 1, 2003

(54) ENHANCE THERMAL STABILITY THROUGH OPTICAL SEGMENTATION

(75) Inventors: Ilan Blech, Los Altos, CA (US); Omar Leung, Palo Alto, CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 09/931,674

(22) Filed: Aug. 16, 2001

(65) Prior Publication Data

US 2003/0035195 A1 Feb. 20, 2003

(51) Int. Cl.⁷ .............................. G02B 26/00; G02B 5/18
(52) U.S. Cl. ........................ 359/291; 359/569; 359/572
(58) Field of Search ................................ 359/291, 566, 359/569, 572

(56) References Cited

U.S. PATENT DOCUMENTS

| | | | | |
|---|---|---|---|---|
| 5,311,360 A | * | 5/1994 | Bloom et al. ............... | 359/572 |
| 5,439,731 A | | 8/1995 | Li et al. ..................... | 428/209 |
| 5,841,579 A | * | 11/1998 | Bloom et al. ............... | 359/572 |
| 5,949,570 A | * | 9/1999 | Shiono et al. .............. | 359/291 |
| 5,999,319 A | * | 12/1999 | Castracane .................. | 359/573 |
| 6,233,087 B1 | * | 5/2001 | Hawkins et al. ............ | 359/290 |
| 6,288,829 B1 | * | 9/2001 | Kimura ....................... | 359/291 |

OTHER PUBLICATIONS

S.T. Pai, et al., "Electromigration in Metals", Can. J. Phys., 55, pp. 103–115(1977).
Olga B. Spahn, et al., "High Optical Power Handling of Pop–Up Microelectromechanical Mirrors", 2000 IEEE/LEOS Intl. Conf. on Optical MEMS, pp. 51–52 (2000).
David M. Burns, et al. "Optical Power Induced Damage to Microelectromechanical Mirrors", Sensors and Actuators A,70, p. 6–14. (1998).

* cited by examiner

Primary Examiner—Georgia Epps
Assistant Examiner—David N. Spector
(74) Attorney, Agent, or Firm—Haverstock & Owens LLP (57) ABSTRACT

The current invention is directed to devices and systems with patterned reflective surfaces. The reflective surfaces are patterned with primary reflective regions and gap regions. The gap regions provide for separation between reflective material within adjacent primary reflective regions. The separation between reflective material reduces atomic flux which can lead to the depletion of the reflective material within regions of the reflective surface that are exposed to an intense light source. The primary reflective regions are preferably formed from a reflective material such as aluminum, silver, gold or platinum. The gap regions are left vacant or deposited with second material which is non-reflective, reflective or semi-reflective. The patterned reflective surface is preferably formed on a micro-structure, such an elongated ribbon. The patterned ribbon structure is preferably one of a plurality patterned ribbon structures in a grating light valve device.

29 Claims, 7 Drawing Sheets

ENHANCE THERMAL STABILITY THROUGH OPTICAL SEGMENTATION

FIELD OF THE INVENTION

The invention relates to optical devices that use specular reflection. More specifically, this invention relates to micro-devices that modulate light through specular reflection.

BACKGROUND OF INVENTION

Specular reflection is used in a number of micro-machine devices with mirror structures for modulating and directing light beams. For example, micro-machine devices with mirror structures are used for optical switches. Grating light valves have several mirror structures that are selectively moved to modulate an incident light beam. Grating light valves have applications in display, print, optical and electrical technologies.

Grating light valves are micro-fabricated from Si-based materials using lithographic and etching techniques. Grating light valves are configured to have a plurality of ribbon structures which are selectively moved by applying an operating bias voltage across the ribbons and a substrate structure coupled to the ribbon structures. The top surfaces of the ribbon structures, and in some instances the top surfaces of the substrate, are provided with a thin reflective coating or layer such as an aluminum layer. The reflectivity of layer or coating tends to degrade after prolonged exposure to an intense light source, thereby limiting the applications where such devices can be used.

It is likely that the observed degradation in reflectivity of the ribbon structures is the result of thermal gradients induced by the small amounts of absorbed light.

Accordingly, to reduce the observed degradation of the reflective surfaces, grating light valves are required to be cooled when used in applications which require that the ribbons experience prolonged exposure to an intense light source. This requires that the device or the system has a cooling mechanism, such as a refrigerator compressor and a circulator. What is needed is a micro-machine with a mirror structure which exhibits consistent reflectivity to prolonged exposure to light. Further, what is needed is a grating light valve with a plurality of reflective ribbon structures which do not exhibit substantial degradation with prolonged exposure to an intense light sources such as laser light source.

SUMMARY OF THE INVENTION

The current invention is directed to optical devices and systems with surfaces for providing specular reflection. More specifically, the invention is directed to micro-structures which modulate or direct a light beam through specular reflection. In accordance with the instant invention, the micro-structure has a patterned reflective surface. The reflective surface is patterned with primary reflective regions formed from a reflective material. The primary reflective regions are separated by gap regions. The reflective surface is patterned to reduce thermal gradient induced atomic flux or atomic migration of the reflective material. Accordingly, patterned reflective surfaces show reduced degradation in reflectivity with prolonged exposure to an intense light source. The micro-device is preferably configured to modulate a light beam by controllably moving the micro-structure relative to the light beam.

The micro-structure can have any number of irregular or regular shapes, including a square or circular shape. The micro-structure is preferably an elongated ribbon structure with a substantially constant width in an active portion of the ribbon structure. The ribbon structure is preferably one of a plurality of ribbon structures within a grating light valve or a micro-electrical mechanical system (MEMS).

The ribbon structure preferably has a length in a range of 50 to 1000 microns and a width in a range of 1.0 to 10.0 microns. The ribbon structure is preferably formed from a Si-based material such as Si, $SiO_2$, $Si_3N_4$ or combination thereof. The ribbon structure is formed using lithographic etching techniques or any other suitable method. The ribbon structure is provided with a patterned reflective surface in the active portion of the ribbon. Preferably, the patterned reflective surface has a segmented pattern, wherein the reflective surface has primary reflective regions separated by linear gap regions.

In accordance with the preferred method of the instant invention, the ribbon structure is provided with a patterned reflective surface by depositing a continuous layer of a reflective material on the surface of a ribbon element and then patterning the layer to form the primary reflective regions and the gap regions. Alternatively, the reflective material is selectively deposited on the surface of a ribbon element to form the reflective regions through a positive or negative mask. The reflective material is preferably a reflective metal, which may be platinum or an alloy thereof.

The reflective regions are preferably 3.0 to 30 microns along the length of the ribbon structure. The primary reflective regions are approximately equal in size and area. Alternatively, the primary reflective regions are varied in size and area. The gap regions are preferably between 0.1 and 2.0 microns along the length of the ribbon. The gap regions are approximately of equal size and area. Alternatively, the gap regions are varied in size and area. Further, the distribution of primary reflective regions and gap regions is symmetric or asymmetric along the length of the ribbon. Preferably, the gap regions account for 10% or less of the total surface area corresponding to the active portion of the ribbon structure. Also, the gap regions preferably extend across the entire width of the ribbon structure to completely isolate the reflective material within primary reflective regions from the reflective material within adjacent primary reflective regions.

In accordance with the instant invention, the gap regions are formed from any number of materials which reduce flux or migration of atomic species between adjacent reflective regions. It is believed that heterogenous interfaces as well as spaces between adjacent primary reflective regions mitigate or reduce atomic flux or migration which can ultimately lead to the degradation of the thin reflective. Accordingly, the gap regions are left vacant and have exposed Si-based ribbon layer or, alternatively, the gaps are coated or filled with a second material. The second material is a different material from the reflective material used to form the primary reflective regions. The second material is a non-reflective material, a reflective material or semi-reflective material. In a preferred embodiment, the gap regions are provided with a high melting point metal such as platinum.

A grating light valve, in accordance with the instant invention, has a plurality of ribbon structures patterned or segmented as described above. A selected portion of the ribbons are configured to move by a distance $n(\lambda/4)$ to modulate a light source having a wavelength $\lambda$. Preferably, the selected portion of the ribbons are selectively moved by applying an alternating bias voltage across the selected ribbons and a substrate couple to the ribbons.

DETAILED DESCRIPTION OF THE INVENTION

The instant invention is directed to a device and system with reflective surfaces for modulating an incident light source. The invention is useful for making micro-mirror devices that are stable to prolonged exposure of an intense light source. The invention is particularly useful for making grating light valves with a plurality of ribbon structures having reflective surfaces for modulating a laser light source.

Figure 1A:
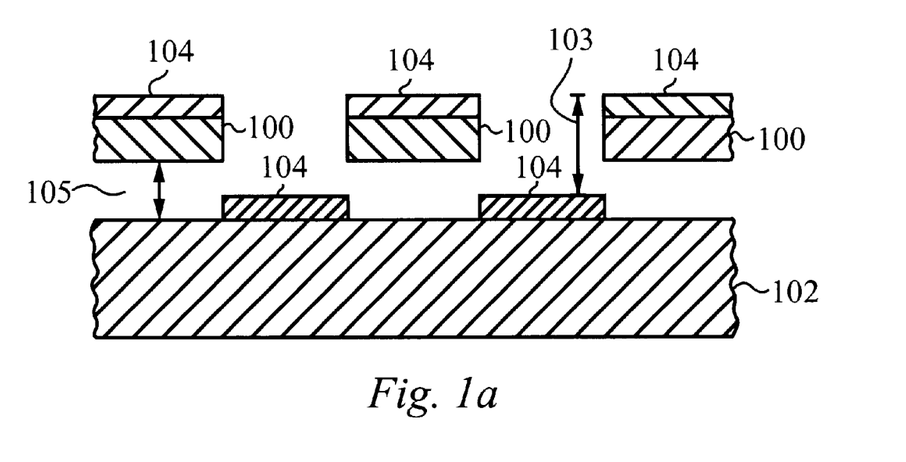
FIG. 1a is a cross-sectional view of a grating light valve with reflective ribbons in a constructive interference position.

Referring to FIG. 1a, the grating light valve construction as taught in U.S. Pat. No. 5,311,360, has a plurality of movable ribbons 100 that are spatially arranged over a substrate 102. The surfaces 104, corresponding to the ribbon tops and the regions of the substrate between the ribbons, are reflective. The surfaces 104 are made to be reflective by depositing a thin film of reflective material, such as silver or aluminum on the substrate 102 and the ribbons 100. The ribbons and the substrate structure are micro-fabricated from a silicon-based materials. The height difference 103 between the reflective surfaces 104 of the substrate 102 and the reflective surfaces 104 of the ribbons 100 are configured to be $\lambda/2$ when the ribbons 100 are in the up position as shown in FIG. 1a. When light having a wavelength $\lambda$ impinges on the complement of reflective surfaces 104, light that is reflected from the surfaces 104 of the substrate 102 and ribbons 100 will be in phase. Light which strikes the reflective surfaces 104 of the substrate 102 travels $\lambda/2$ further than the light striking the reflective surfaces 104 of the ribbons 100. Then the portion of light that is reflected back from the reflective surfaces 104 of the substrate 102 returns traveling an additional $\lambda/2$ for a total of one complete wavelength $\lambda$. Therefore, the complement of the reflective surfaces 104 functions as a mirror to the incident light source with a wavelength $\lambda$.

Figure 1B:
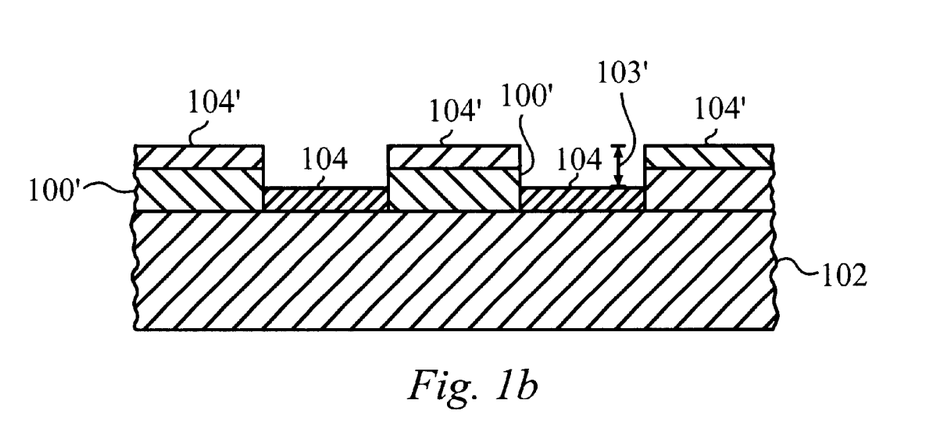
FIG. 1b is a cross-sectional view of the grating light valve shown in FIG. 1a with the active ribbons displaced to a destructive interference position.

By applying an appropriate bias voltage across the ribbons 100 and the substrate 102, a portion of the ribbons 100 moves towards and contact the substrate 102, as shown in FIG. 1b. The thickness $T_r$ of the ribbons 100 is designed to be $\lambda/4$ such that the distance 103' is also $\lambda/4$. When light having a wavelength $\lambda$ impinges on surfaces 104 and 104' with the ribbons 100 in the down position, as shown in FIG. 1b, the portion of light reflected from the surfaces 104' of the ribbons 100 will be out of phase with the portion of light reflected from the surfaces 104 of the substrate 102, thereby generating the conditions for destructive interference. By alternating the ribbons between the positions for constructive interference, as shown in FIG. 1a, and the positions for destructive interference, as shown in FIG. 1b, the grating light valve is capable of modulating the intensity of reflected light from an impinging light source having a wavelength $\lambda$.

Figure 2A:
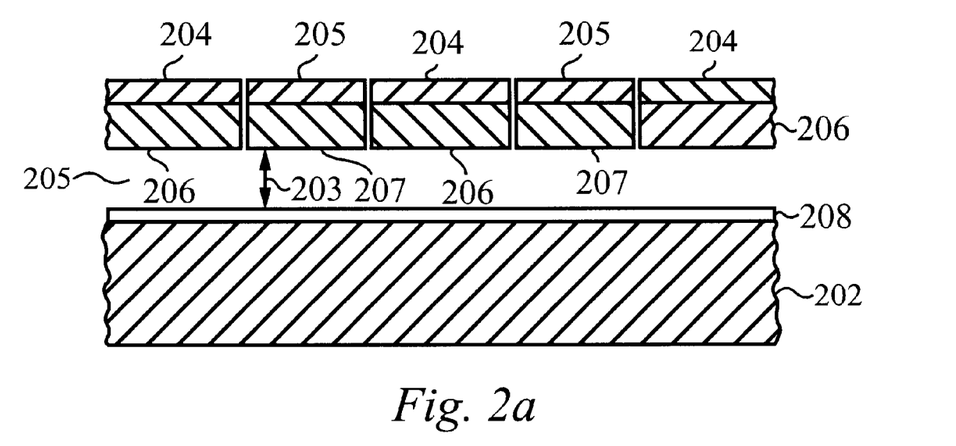
FIG. 2a is a cross-sectional view of the grating light valve with set of active ribbons and a set of bias ribbons in the same reflective plane.
Figure 2B:
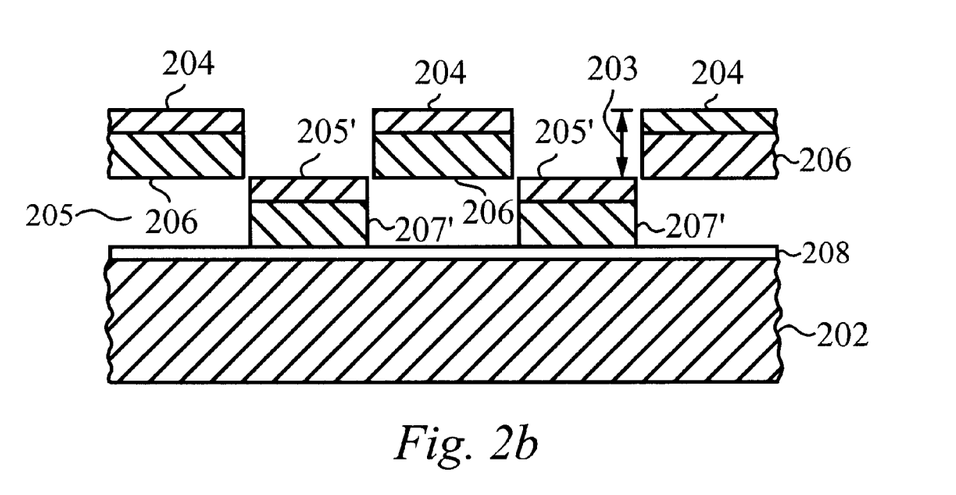
FIG. 2b is a cross-sectional view of the grating light shown in FIG. 2a with the active ribbons displaced from the bias ribbons.

There have been several advances in grating light valve devices both in the fabrication process and in design. For example, flat diffraction grating light valves and their advantages are described in U.S. Pat. Nos. 5,841,579 and 5,808,797, both issued to Bloom et al., the contents of which are incorporated by reference. FIGS. 2a–b illustrate cross sectional views of a flat diffraction grating light valve and its operation. Flat diffraction grating light valves have at least two sets of alternating ribbons 206 and 207 that are approximately in the same reflective plane.

Referring to FIG. 2a, the ribbons 206 and 207 are suspended over a substrate structure 202 by a distance 205. The ribbons 206 and 207 are provided with reflective surfaces 204 and 205, respectively. Preferably, the surface of the substrate 202, or a portion thereof, also has a reflective surface 208. The reflective surfaces of the substrate 208 and the reflective surfaces of the ribbons 204 and 205 are preferably configured to be separated by a distance approximately equal to a multiple of $\lambda/2$ of the impinging light source. Thus the portion of light that is reflected from the compliment of surfaces 204, 205 and 208 are all phase and constructively interfere and, therefore, the maximum intensity is observed. In operation, the flat diffraction grating light valve alternates between the conditions for constructive and destructive interference by moving the first set of ribbons 206 or the second set of ribbons 207 relative to each other by a distance corresponding to $\lambda/4$.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient bias voltage across the active ribbon and the substrate created Colombic attractions and/or repulsions between the active ribbons and the substrate.

Now referring to FIG. 2b, when a sufficient bias voltage is applied across the active of ribbons 207 and the substrate 202, the ribbons 207 are displaced relative to the bias ribbons 206 by a distance 203 that is approximately equal to a multiple of λ/4. Accordingly, the portions of light that are reflected from the surfaces 205' of the active ribbons 207 will destructively interfere with the portion of light that is reflected off the surfaces 204 of the bias ribbons 206. It will be clear to one skilled in the art that a grating light valve may be configured to modulate an incident light source with a wavelength λ in other operative modes. For example, both sets of ribbons 206 and 207 may be configured to move and separate by multiples of λ/4 in order to alternate between the conditions for constructive and destructive interference.

The grating light valves illustrated in FIGS. 1a–b and 2a–b are exemplary only. Other designs of grating light valve have ribbon structures which do not contact the substrate and/or which are not attached by both ends to a substrate. For example, a ribbon structure in accordance with the instant invention is attached coupled to by a single end to a substrate, coupled centrally through a central portion of the ribbon to a substrate or coupled at several location along the ribbon to a substrate element.

When a light source impinges on highly a reflective surface, such as the reflective surface of a ribbon structure within grating light valve, most of the light is reflected. However, reflective surfaces are never 100 percent reflective and a small portion of the light is absorbed by the reflective surface. Generally, the small portion of light that is absorbed is converted into thermal energy or heat which ultimately can result in the degradation of the thin reflective layer on the ribbon structure.

There are two mechanisms by which thermal degredation of a reflective surfaces can take place. One mechanism is hillock growth, whereby heat causes atomic species within the reflective layer to cluster into micro-domain structures. A second mechanism, referred to herein as atomic flux, occurs when there is a thermal gradient across a reflective surface. For example, aluminum experiences atomic flux under conditions of a thermal gradient, wherein an aluminum atomic species migrates from hotter portions of the reflective surface to cooler portions of the surface.

Atomic flux is typically observed in grating light valves when the ribbons are exposed to intense light for an extended period of time. The thermal gradient occurs across a ribbon for two reasons. Firstly, the entire ribbon is not typically exposed to the light source and the un-exposed regions remain cooler than the exposed regions, thereby setting up a thermal gradient between the hotter exposed region and the cooler un-exposed regions. Secondly, the portions of the ribbon structure which are coupled to a substrate can more efficiently dissipate heat, thus keeping these portions cooler. Atomic flux will occur in many cases to the point of completely depleting the light exposed portions of the ribbon structure from reflective material.

In general, the present invention is directed to methods for reducing atomic flux in micro-mirror structures with a thin layer of reflective material. For example, atomic flux is reduced in the ribbon structures through patterning or segmentation, whereby the reflective surfaces of the ribbon structures are partitioned into isolated primary reflective regions separated by gap regions. The gap regions effectively eliminate a mechanism for atomic species to migrate over the gap region of the ribbon structures by confining atoms to the isolated structures and, thus preventing depletion reflective material in the active exposed regions of the ribbon structures.

Figure 3A:
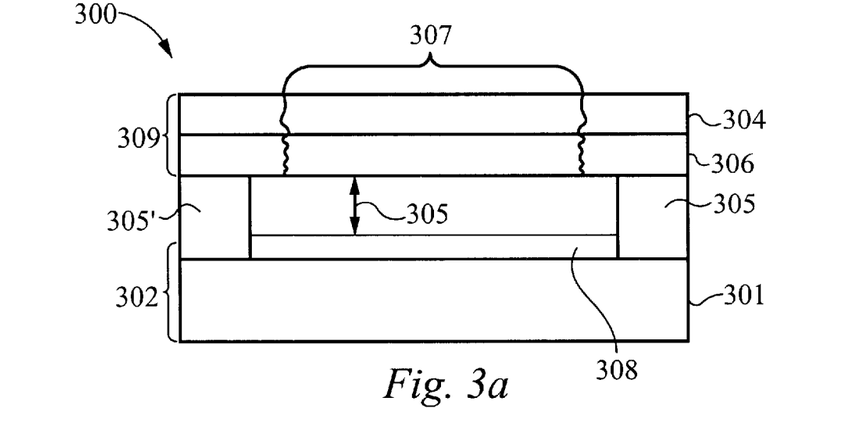
FIG. 3a is a cross-sectional side view of a single ribbon structure suspended over a substrate element.

FIG. 3a shows a cross-sectional side view 300 of a single ribbon structure 309 suspended over a substrate structure 302 by both ends of the ribbon 306 through support features 305 and 305'. As previously discussed, the ribbon 306 is alternatively suspended over the substrate structure 302 by a single support feature or support features at any other locations along the length of the ribbon 306. The ribbon 306 is separated from a substrate surface 308 by a distance 305. The ribbon is preferably configured to move a portion of the distance 305 corresponding to n(λ/4).

The ribbon 306, the support features 305 and 305' and a substrate element 301 are preferably formed from a silicon-based material using lithographic and etching techniques. The silicon-based material is Si, $SiO_2$, $Si_3N_4$ or any combination thereof. The ribbon 306 is provided with a reflective layer 304. In accordance with the current invention, the reflective layer 304 is patterned, as described in detail below. The substrate element 301 also preferably has a reflective layer 308. The reflective layers 304 and 308 are preferably formed from Ag, Au, Pt, Al or an alloy thereof. The reflective layers 304 and 308 are preferably deposited to a thicknesses in a range of 300 to 3000 Angstroms, and more preferably to a thickness in a range of 500 to 1000 Angstroms. The active portion 307 of the ribbon structure 309 corresponds to the portion of the ribbon structure 309 that is exposed the light source.

Figure 3B:
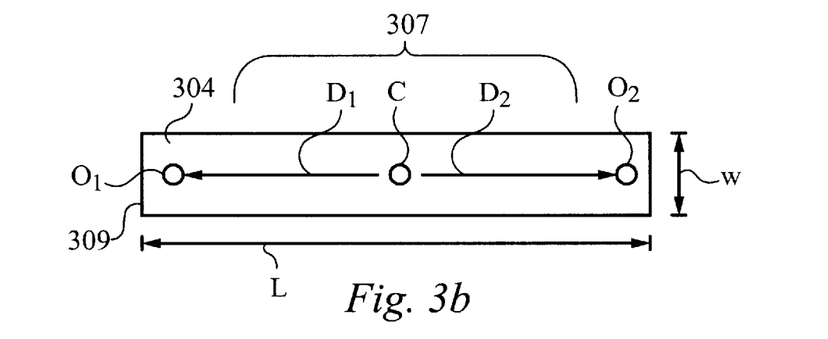
FIGS. 3b is a top view of a single ribbon element.

FIG. 3b is a top view of a single ribbon structure 300. The ribbon structure 300 preferably has a length L in a range of 50 to 500 microns and a width W in a range of 1.0 to 6.0 microns. In use, the active portion 307 of the ribbon 306 is exposed to a light source (not shown). Most of the light is reflected by the surface 304. A small portion of the light is absorbed by the surface 304 and converted to thermal energy generating a thermal gradient along the length L of the ribbon 306. The thermal gradient typically extends from a hotter central portion C of the reflective surface 304 to cooler outer portions $O_1$ and $O_2$ of the reflective surface 304.

Figure 3C:
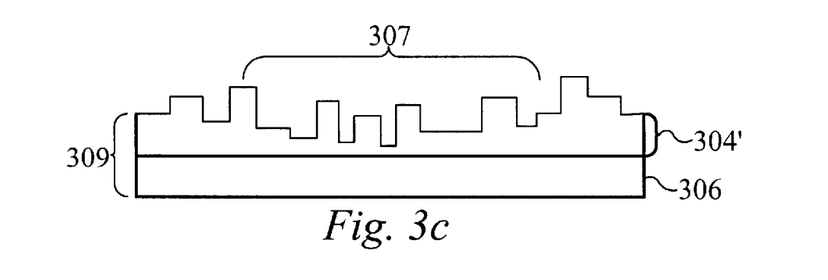
FIG. 3c shows a schematic side view of a ribbon structure with a continuous reflective surface after prolonged exposure to an intense radiation source.

FIG. 3c shows a schematic side view of the ribbon structure 309 with the continuous reflective layer 304 after prolonged exposure to an intense light source. After prolonged exposure to the intense light source, the reflective material on the layer 304 is displaced from the central portion C of the reflective layer 304 to the outer portions $O_1$ and $O_2$ of the reflective layer 304 and illustrated by 304'. In fact, the depletion of reflective material in the central portion C of the layer 304 can be complete, such that the central portion C is no longer reflective to the incident light.

Figure 3D:
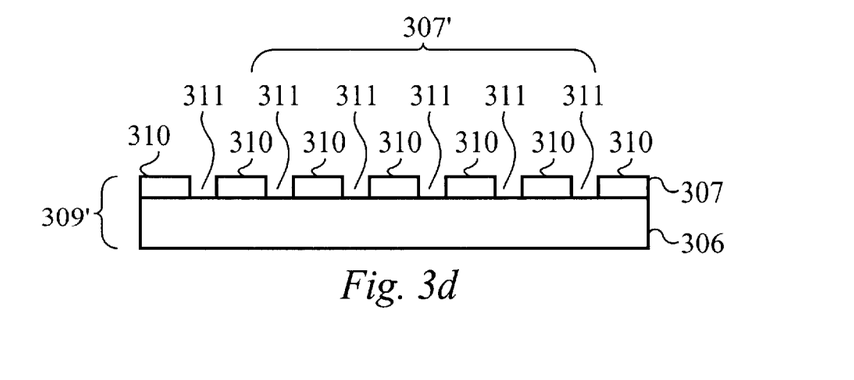
FIG. 3d shows a schematic side view of a ribbon structure with a patterned reflective surface after prolonged exposure to an intense radiation source.

FIG. 3d shows a schematic side view of the ribbon structure 309' with a patterned or segmented reflective surface 307. After prolonged exposure to an intense light source there is little or no discernable depletion of reflective material from the active region 307' of the ribbon structure 309'. In accordance with the current invention, patterning or segmenting of the reflective layer 307 is accomplished by any suitable method, including wet etching and focused ion beam techniques. Patterning can lead to less total reflective surface area in the active region 307' of the ribbon structure 309' as compared to the continuous reflective layer 304 illustrated in FIG. 3a. Therefore, there is a need to the minimize the spacing and or the area of the gap regions 311 such that the gap regions 311 account for a small amount of the total surface area of the reflective layer 307. Alternatively, the gap regions 311 are filled with a second reflective material to recapture the reflective surface area that is lost in the patterning process.

Figure 4A:
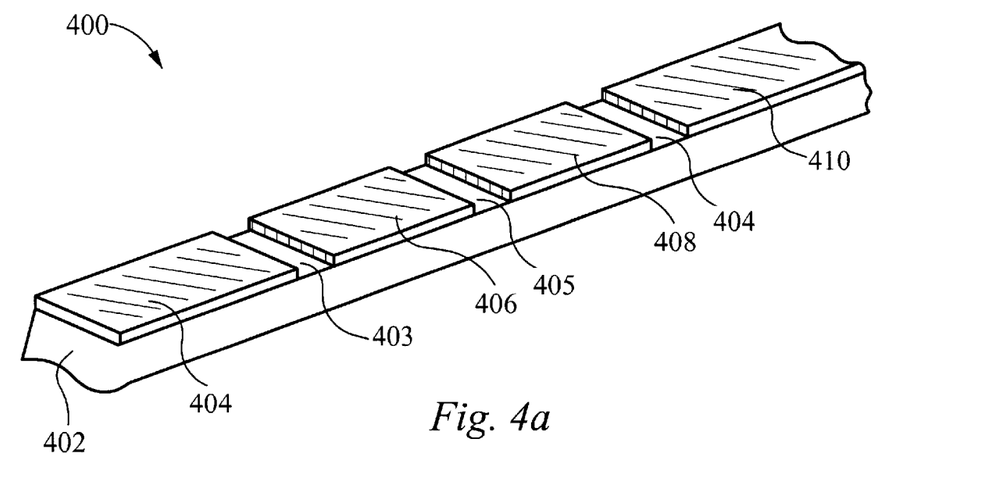
FIGS. 4a–b are perspective cut-out views of ribbon structures with a patterned reflective surface, in accordance with the instant invention.

FIG. 4a is a perspective cut out view of a ribbon structure 400 with a patterned reflective layer 407 in accordance with the instant invention. The ribbon 402 is formed from a silicon based material, such as Si, $SiO_2$, $Si_3N_4$ or a combination thereof. A reflective material is deposited on the ribbon 402 by sputtering, vapor deposition or any other suitable method to form the reflective layer that is preferably 500 to 1000 Angstroms thick. The reflective material is preferably Ag, Au, Pt, Al or an alloy thereof. The reflective layer is patterned with a plurality of primary reflective regions 404, 406, 408 and 410 separated by a plurality of gap regions 403, 405 and 407. Preferably, the primary reflective regions 404, 406, 408 and 410 and the gap regions 403, 405 and 407 extend across the entire width of the ribbon 402, as shown. Further, the gap regions 403, 405 and 407 preferably completely separate the primary reflective regions 404, 406, 408 and 410. In accordance with an embodiment of the invention, the gap regions 403, 405 and 407 are exposed surface regions of the underlying ribbon structure 402.

Figure 4B:
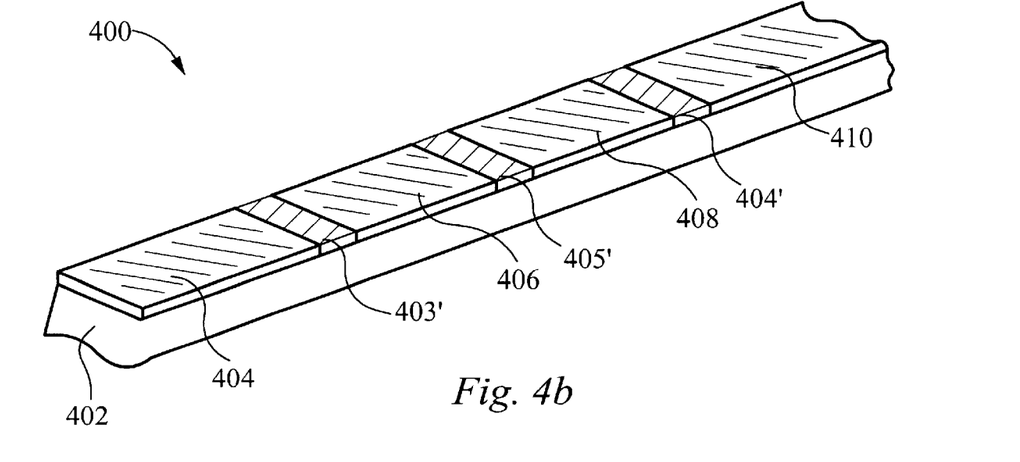

Now referring to FIG. 4b, in an alternative embodiment of the current invention, the gap regions 403' 405' and 407' are formed from a second material that is deposited into the gap regions 403, 405 and 407 shown in FIG. 4a. The second material is a reflective material, a non-reflective material or a semi-reflective material. However, the second material is a different material from that material used to form the primary reflective regions 404, 406, 408 and 410. The gap regions 403', 405' and 407' provide heterogeneous interfaces between the primary reflective regions 404, 406, 408 and 410 and the gap regions 403', 405' and 407' which reduces atomic flux. According to a preferred embodiment of the invention, the second material is a high melting point metal, such as platinum.

Figure 5:
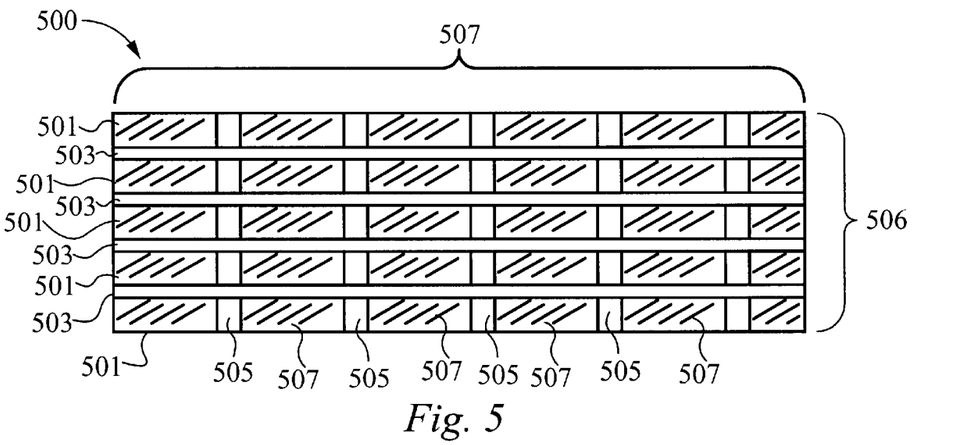
FIG. 5 is a schematic representation of a grating light valve with a plurality of patterned ribbon structures, in accordance with a preferred embodiment of the instant invention.

FIG. 5 shows a schematic representation of an active portion 500 of a grating light valve having a plurality of ribbons 501 that are disposed in a substantially parallel fashion across the width 506 of the active portion 500. The ribbons 501 are preferably equally spaced by separation regions 503 which correspond to exposed portions of an underlying substrate. The separation regions 503 are preferably reflective. Each of the ribbons 501 are patterned with a plurality of gap regions 505 that are separated by a plurality of primary reflective regions 507. In accordance with a preferred embodiment of the invention, the gap regions 505 and the reflective regions 507 are equal or nearly equal in length along the length 507 of the ribbon 501. Further, each of the ribbons 501 are preferably patterned in a substantially similar fashion along the width 506 of the active region 500. The reflective regions 507 are preferably in a range of 1 to 30 microns along the length 506 of each of the ribbons 501 and more preferably 25 microns or less along the length 507 of each of the ribbons 501. The gap regions are preferably 0.1 to 2.0 microns along the length 507 of each of the ribbons 501 and more preferably 1.0 microns or less along the length 507 of each of the ribbons 501. It is also preferable that the gap regions 505 cumulatively account for less than 10% of the total reflective surface of the ribbons 501.

Figure 6A:
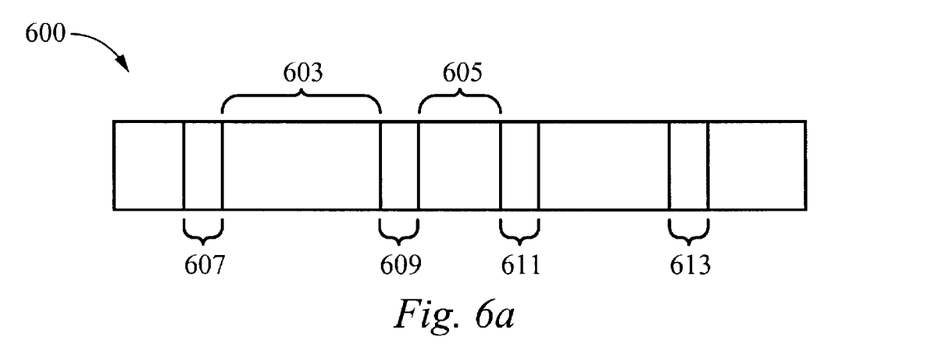
FIGs. 6a–b illustrate ribbon structures patterned with reflective surfaces, in accordance with alterative embodiments of the instant invention.
Figure 6B:
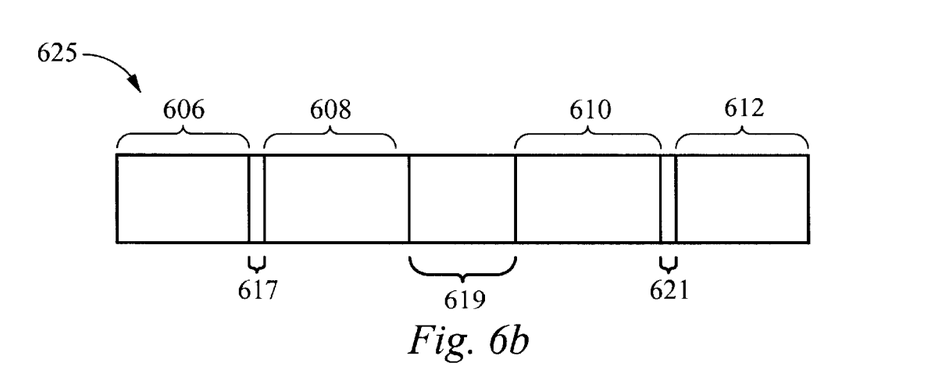

FIGS. 6a–b illustrate ribbon structures patterned with reflective surfaces in accordance with alterative embodiments of the instant invention. FIG. 6a shows a patterned ribbon structure 600 patterned with a plurality of gap regions 607, 609, 611 and 613 that are separated by a plurality of reflective regions 603 and 605. The reflective region are not equal in length along the ribbon 600, while the gap regions 607, 609, 611 and 613 are substantially similar in length along the ribbon 600.

FIG. 6b illustrates a ribbon structure 625 patterned with a plurality of reflective regions 606, 608, 610 and 612, which are not equal in length along the ribbon 625 and which are separated by a plurality of gap regions 617, 619 and 621 which are also not equal in length along the ribbon 625. It will be clear to one skilled in the art that any number of geometric arrangements of reflective regions and gap regions can provide the advantages of the current invention.

Figure 7:
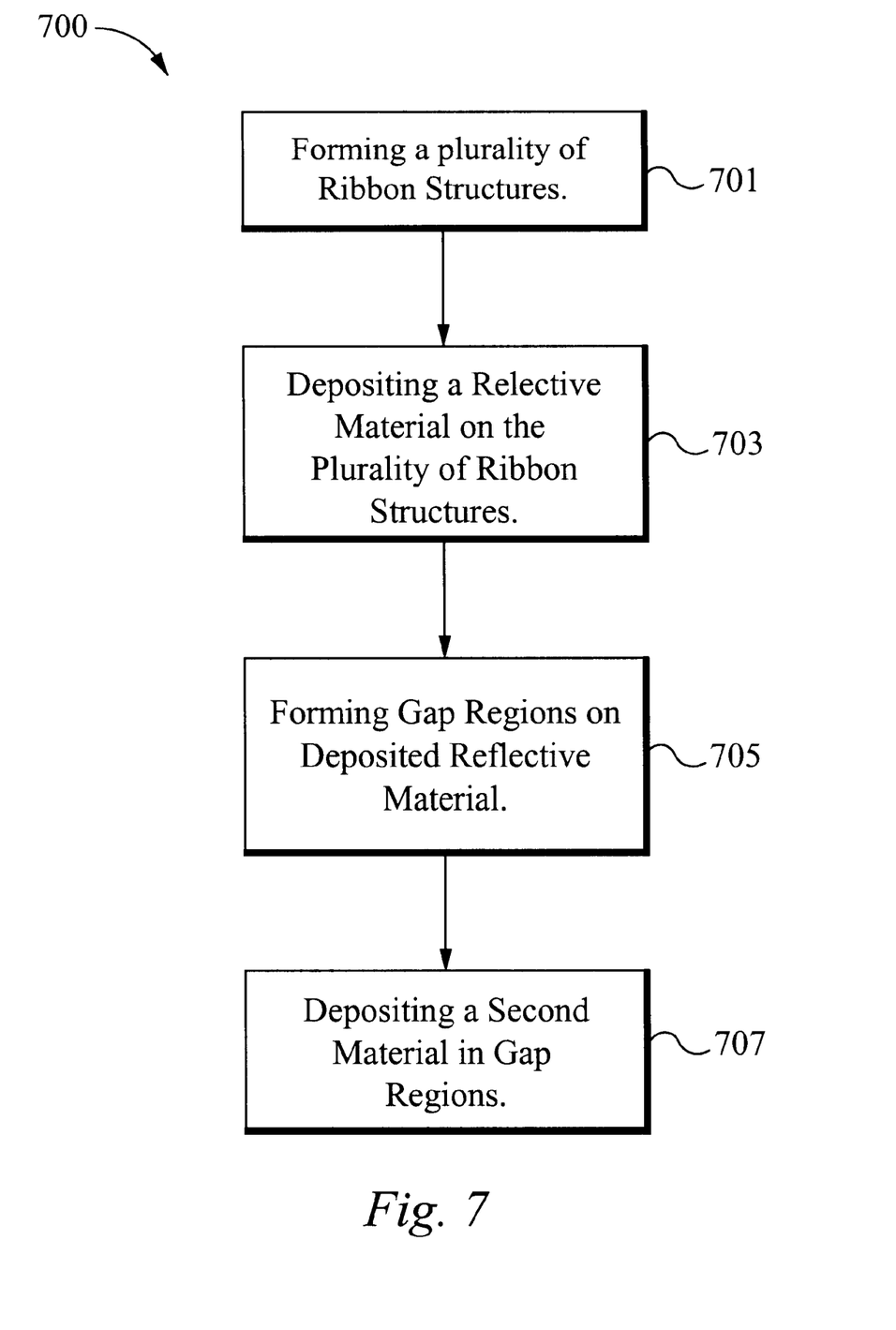
FIG. 7 is a block-flow diagram of a method for making a patterned ribbon structure, in accordance with the instant invention.

FIG. 7 shows block diagram of a preferred method for making a grating light valve with a patterned reflective layer in accordance with the instant invention. In the step 701, a grating light valve structure is formed, wherein the grating light valve has a plurality of ribbon structures configured to selectively move. The grating light valve structure is preferably formed from silicon-based materials using lithographic and etching techniques. In the step 703, a reflective material is deposited onto the ribbon surfaces to form a continuous layer of reflective material on each of the ribbons that is preferably 300 to 3000 Angstroms thick, and more preferably 500 to 1000 Angstroms thick. The reflective material is deposited in the step 705 using sputtering, vapor deposition of any other suitable method depending on the reflective material used. In the step 705, the continuous layers of reflective material are patterned to form gap regions on the ribbons. The continuous layers are patterned in the step 703 using wet etch techniques, focused ion beam etch or any other suitable technique depending on the reflective material used. After the layers of reflective material are patterned in the step 705, then in the step 707 a second material is placed within the gap regions. The second material is placed into the gap regions using any suitable deposition method.

The current invention has applications for patterning reflective surfaces in two and three dimensions. For example, FIGS. 8a–b show two-dimensionally patterned reflective surfaces in accordance with alternative embodiment of the instant invention.

Figure 8A:
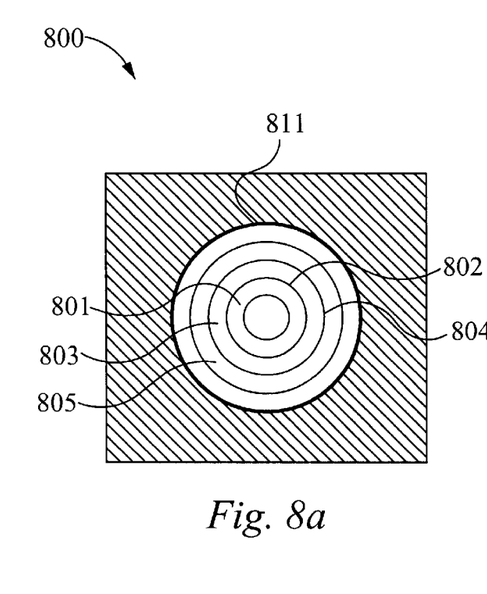
FIGS. 8a–b show two dimensionally patterned reflective surfaces in accordance with an alternative embodiment of the instant invention.

Referring to FIG. 8a, a surface is 800 has a reflective section 811. The reflective section 811 is patterned into a plurality of circular reflective sections 801, 803 and 805. The circular reflective regions 801, 803 and 805 are separated by circular gap regions 802 and 804 as described in detail above.

Figure 8B:
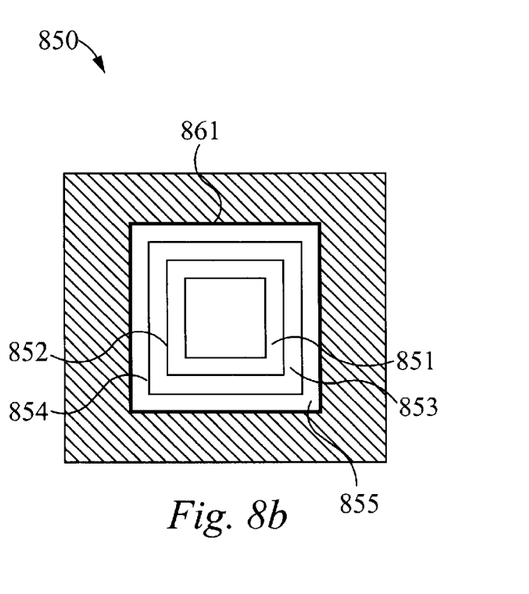

Referring to FIG. 8b, a surface is 850 has a reflective section 861. The reflective section 861 is patterned into a plurality of square reflective regions 851, 853 and 855. The square reflective regions 851, 853 and 855 are separated by square gap regions 802 and 804. The patterned reflective regions, in accordance with the instant invention may have any number of regular or irregular shaped reflective regions and gap regions. Further, the reflective regions and the gap regions are not require to have the same shape.

The present invention has been described relative to a preferred embodiment. Improvements or modifications that become apparent to persons of ordinary skill in the art only after reading this disclosure are deemed within the spirit and scope of the application. A patterned reflective surface of the current invention is not limited to grating light valves and may be used to provide a stable reflective surfaces for any number of micro devices. Further, it is understood that practicing the instant invention is not dependent on a particular grating light valve construction chosen.

What is claimed is:

1. A device for controllably reflecting an incident light, the device comprising a moveable structure with a segmented reflective surface, wherein the segmented reflective surface comprises a plurality of reflective regions each separated by gap regions.

2. The device of claim 1, wherein segmented reflective regions are formed from a metal selected from the group consisting of aluminum, gold, and silver.

3. The device of claim 1, wherein the movable structure is a ribbon structure with a length in a range of 50 to 500 microns and a width in a range of 1.0 to 6.0 microns.

4. The device of claim 3, wherein the ribbon structure is formed from a Si-based material.

5. The device of claim 4, wherein the Si-based material is selected from the group consisting of Si, $SiO_2$, and $Si_3N_4$.

6. The device of claim 3, wherein the segmented reflective regions are in a range of 1 and 30 microns along the length of the ribbon structure.

7. The device of claim 6, wherein the segmented reflective regions are substantially equal in length.

8. The device of claim 6, wherein the at least one of the segmented reflective regions has a different length than at least another one of the segmented reflective regions.

9. The device of claim 3, wherein the gap regions between the segmented reflective regions are in a range of 0.1 to 2.0 along the length of the ribbon.

10. The device of claim 2, further comprising a high melting point metal deposited within the gap regions.

11. The device of claim 9, wherein the high melting point metal is platinum.

12. An optical device comprising a segmented reflective ribbon structure with an active area for reflecting light, the active area comprising a plurality of reflective regions separated by gaps, wherein the gaps are 10 or less percent of the total active area of the ribbon.

13. The optical device of claim 12, wherein the segmented reflective ribbon structure is a ribbon structure of a grating light valve comprising a plurality of segmented reflective ribbon structures, wherein the plurality of segmented reflective ribbon structures are controllably moved to modulate an incident light source.

14. The optical device of claim 13, wherein the plurality of segmented reflective ribbon structures are moved by a distance of an integral multiple of a quarter of a wavelength to switch between the conditions for constructive and destructive interference with the incident light source having the wavelength.

15. The optical device of claim 12, wherein the reflective regions are coated with aluminum.

16. The optical device of claim 15, wherein the gaps comprise platinum.

17. A system comprising a light modulator, the light modulator comprising a plurality of movable segmented reflective ribbon structures for moving a distance of an integral multiple of a quarter of a predetermined wavelength to switch between the conditions for constructive and destructive interference with an incident light source having the predetermined wavelength, wherein the segmented reflective ribbon structures comprise a plurality of reflective surface segments formed from a first material and second material distributed in an alternating fashion.

18. The system of claim 17, wherein the first material comprises a metal selected from the group consisting of aluminum, gold, silver, and platinum.

19. The system of claim 18, wherein the second material is a silicon-based material.

20. The system of claim 19, wherein the silicon-based material is selected from the group consisting of consisting or Si, $SiO_2$, and $Si_3N_4$.

21. The system of claim 17, wherein $\lambda$ is between 800 and 4000 nanometers.

22. A method of making a thermally stable segmented reflective surface on a micro structure comprising the steps of:
   a. forming a reflective surface on the micro-structure;
   b. patterning the reflective surface to form reflective segments and gaps.

23. The method of claim 22, wherein the micro-structure is an elongated ribbon structure having a substantially constant width.

24. The method of claim 22, wherein the reflective metal is selected from the group consisting of aluminum, gold silver, and platinum.

25. The method of claim 22, wherein the gaps are uniformly patterned across the width of the ribbon structure.

26. The method of claim 25, wherein the gaps are uniformly patterned along the length of the ribbon structure.

27. The method of claim 24, wherein the gaps are patterned into the reflective metal layer by a method selected from the group consisting of FIB, wet etch and dry etch.

28. A system comprising
   a. means to generate a light beam with a selected wavelength; and
   b. means to modulate the light from the light beam, the means to modulate the light from the light beam comprising a plurality of ribbons with patterned reflective surfaces, wherein each reflective surface comprises highly reflective segments separated by gap sections, whereby a portion of the plurality of ribbons are selectively moved to modulate light from the light beam with the light beam incident on the reflective surfaces.

29. The system of claim 28, wherein the portion of ribbons are selectively moved by applying a bias voltage across selected ribbons and a substrate coupled to the ribbons.

* * * * *